United States Patent
Loher (10) Patent No.: US 6,449,282 B1
(45) Date of Patent: Sep. 10, 2002

(54) METHOD FOR RANDOM-ACCESS COMMUNICATION WITH BINARY FEEDBACK

(75) Inventor: Urs Loher, Ostermundigen (CH)

(73) Assignee: Swisscom AG, Bern (CH)

( * ) Notice: Subject to any disclaimer, the term of this patent is extended or adjusted under 35 U.S.C. 154(b) by 0 days.

(21) Appl. No.: 09/403,858

(22) PCT Filed: Oct. 20, 1998

(86) PCT No.: PCT/EP98/06980

§ 371 (c)(1),
(2), (4) Date: Oct. 27, 1999

(87) PCT Pub. No.: WO99/46889

PCT Pub. Date: Sep. 16, 1999

(30) Foreign Application Priority Data

Mar. 11, 1998 (EP) .............................. 98810209

(51) Int. Cl.[7] ...................... H04L 12/413; H04L 12/43; H04J 3/02
(52) U.S. Cl. ...................... 370/447; 370/445; 370/461; 370/462
(58) Field of Search ................................ 370/445–447, 370/448, 461, 462, 442, 347, 449, 452, 458, 459, 460, 444; 340/825.5; 455/403, 422, 423

(56) References Cited

U.S. PATENT DOCUMENTS 6,009,468 A * 12/1999 Lau et al. ................... 370/444
6,292,493 B1 * 10/2001 Campbell et al. .......... 370/445

OTHER PUBLICATIONS

Mahravari, "Random–Access Communication with Multiple Reception", IEEE Transactions on Information Theory, vol. 36., No. 3, May 1, 1990, XP000132605, pp. 614–622.

Paterakis, "A Limited Sensing Random Access Algorithm with Binary Success–Failure Feedback", Proceedings of the Asilomar Conference on Signals, Systems and Computers, Pacific Grove, Oct. 31–Nov. 2, 1988, Two volumes bound as one volume, vols. 1&2, No. Conf. 22, Oct. 31, 1988, XP000130225, pp. 97–101.

Tsybakov, et al., "Random Multiple Access in a Channel with Binary 'Success–No Success' Feedback", Problems of Inormation Transmission, vol. 26, No. 3, Jul. –Sep. 1990, XP002099575, pp. 245–260.

(List continued on next page.)

Primary Examiner—Nay Maung
Assistant Examiner—Raymond B. Persino
(74) Attorney, Agent, or Firm—Pillsbury Winthrop LLP (57) ABSTRACT

Method for random-access communication in communication networks (1) with time-slotted transmission channels which are being accessed by a plurality of terminal devices (2), whereby the terminal devices (2) are provided with binary feedback (S/$\bar{S}$) by a common receiver (3), a positive feedback (S) indicating that a particular slot contained a successfully transmitted packet or a negative feedback ($\bar{S}$) indicating that the particular slot did not contain a successfully transmitted packet, and whereby dummy packets are transmitted by an auxiliary user (4) following the first negative feedback ($\bar{S}$) after a prior collision has been resolved to determine whether said negative ($\bar{S}$) feedback was due to a collision of packets in the respective slot or whether it was due to this slot having been empty.

Unsuccessfully transmitted packets are re-transmitted in accordance with their respective position in an interval, which position is determined by the numeric value of a parameter assigned to each packet, which interval is divided into two portions by a predefined parameter ($\alpha$), and which numeric values are randomized after a negative feedback ($\bar{S}$) occurred during the resolution of a collision.

12 Claims, 2 Drawing Sheets

OTHER PUBLICATIONS

Stavrakakis, et al., "A Limited Sensing Protocol for Multiuser Packet Radio Systems", IEEE Transactions on Communications, vol. 37, No. 4, Apr. 1989, XP000051471, pp. 353–359.

Loher, "The Role of Information in Random Accessing", Proceedings of IEEE International Symposium on Information Theory, Jun. 29–Jul. 4, 1997, XP002099265, p. 321.

Roberts, "Aloha Packet System with and Without Slots and Capture", reprinted from Computer Communications Review, vol. 5, No. 2, Apr. 1975, pp. 28–42.

Berger, et al., "Random Multiple–Access Communication and Group Testing", IEEE Transactions on Communications, vol. Com–32, No. 7, Jul. 1984, pp. 769–779.

Massey, "Collision–Resolution Algorithms and Random–Access Communications", Multi–User Communication Systems, CISM Courses and Lectures No. 265, International Centre for Mechanical Sciences, 1981, pp. 73–137.

* cited by examiner

METHOD FOR RANDOM-ACCESS COMMUNICATION WITH BINARY FEEDBACK

This application is the national phase of international application PCT/EP98/06980 filed Oct. 20, 1998, which designated the U.S.

The present invention relates to a method for random-access communication with binary feedback. Specifically, the present invention relates to a method for random-access communication with binary feedback in communication networks with time-slotted transmission channels which are accessed by a plurality of terminals, whereby random-access means that users attempt to communicate whenever they have information to transmit, whereby communication networks with time-slotted communication channels are communication networks where data may be transmitted only at regular prescribed time intervals, so called time-slots, and whereby binary feedback means that users of the communication network are provided with information about whether or not a previous time-slot contained a successfully transmitted data packet.

In communications, random-access to a single channel, as for instance a satellite communication network, a local area network, or a mobile radio network, requires organization and coordination of a plurality of users efficiently sharing the resources of said single channel, said channel being a collision-type, packet switched, time-slotted transmission channel.

Access algorithms for this general model have been proposed and analyzed in the paper "Collision Resolution Algorithms and Random-Access Communications," published by Springer in 1981, in *Multi-User Communications, CISM Courses and Lectures*, number 265 (document D1). In document D1, a collision resolution algorithm for randomly accessing a collision-type channel with feedback is defined as a protocol for the transmission and re-transmission of packets by individual transmitters, all packets involved in the collision eventually being re-transmitted successfully and all transmitters (not only those whose packets collided) eventually and simultaneously becoming aware that these packets have been successfully re-transmitted. The collision is considered to be resolved precisely at the point where all the transmitters simultaneously become aware that the colliding packets have all been successfully re-transmitted. An interval is considered to be resolved when all the messages generated in that interval have been successfully transmitted. A basic interval commences after a prior interval has fbeen resolved. These definitions given in document D1 will be used throughout the remainder of this text.

Access algorithms for the general model described above have also been proposed and analyzed in the paper "Random Multiple-Access Communication and Group Testing," published in April 1984, in *IEEE Transactions on Communications*, volume COM-32, pages 769–784 (document D2); and in the paper "Random-Access Communication with Multiple Reception," in May 1990, in *IEEE Transactions on Information Theory*, volume IT-36, pages 614–622 (document D3). In both of these papers, document D2 and D3, models of binary success/no-success feedback have been studied. Success/no-success feedback provides the users of the transmission channel with information indicating as to whether or not a given slot contained a successfully transmitted packet. This is required, for instance, in situations where a receiver cannot distinguish between channel noise and collision noise, and could be achieved, for example, by means of a Cyclic Redundancy Check (CRC). As is pointed out in document D3, spread-spectrum random-access systems can result in success/no-success feedback when the users keep the transmitted power spectrum low. This makes it difficult to distinguish the noise-like waveform, resulting from the collision of two or more transmitted packets, from noise alone. Another example of binary feedback might be in the area of wireless Asynchronous Transfer Mode (ATM) networks where the low-rate feedback of the access point of the mobile user informs the user as to whether or not an error in the transmitted packet (which forces a re-transmission) has been detected. The best performance, measured in terms of successful transmissions per channel use, previously reported for success/no-success feedback is a throughput of 0.329 (32.9%), as stated in document D3.

In the paper "Random Multiple Access in a Channel with Binary Success/No-Success Feedback," published in 1990, in *Problemy Peredachi Informatsii*, volume 26, number 3, pages 67–82 (document D5), it was stated that the throughput of success/no-success feedback might be improved to $1/e$ (~0.368), i.e. to the maximum achievable throughput of ALOHA, described in "ALOHA Packet System With and Without Slot and Capture," published in 1972 and reprinted in 1975, in *Computer Communication Review*, volume 5, pages 28–42 (document D4).

The notion of an auxiliary user in the context of random accessing systems was introduced in document D2, and adopted in document D5 and in the paper "A Limited Sensing Random-Access Algorithm with Binary Success Failure Feedback," in 1989, in IEEE Transactions on Communications, volume COM-37, pages 526–530 (document D6). The auxiliary user is a dummy user who transmits a dummy packet during particular slots. The purpose of the auxiliary user's action is to implicitly transform the success/no-success feedback into a ternary idle/success/collision-type feedback by sacrificing one slot. As already mentioned, for a protocol to be a collision resolution algorithm, it is mandatory that all the users recognize the end of a collision resolution. Without an auxiliary user or a similar concept of test packets, as was described in document D5, this would not be possible for pure success/no-success feedback in an environment with a plurality of users. In the algorithm described in document D6, a dummy packet is transmitted by an auxiliary user after every occurrence of a no-success feedback, i.e. a negative feedback, each time sacrificing one slot. Also in the algorithm described in document D5, possibly multiple slots are sacrificed for dummy packets transmitted by an auxiliary user during the resolution of a collision.

It is an object of this invention to propose a new and improved method for random-access communication with binary feedback in communication networks with time-slotted transmission channels which are accessed by a plurality of terminal devices (users), whereby unsuccessfully transmitted packets are retransmitted, and whereby an auxiliary user transmits dummy packets.

According to the present invention, these objects are achieved particularly through the features of the characterizing part of the independent claims. In addition, further advantageous embodiments follow from the dependent claims and the description.

In particular, these objects are achieved according to the invention in that the order of re-transmitting unsuccessfully transmitted packets, i.e. packets that were involved in a collision, depends on their respective position in an interval, whereby this position is determined by the numeric value of a parameter assigned to each packet, and whereby these numeric values are altered after a negative feedback (no-success feedback) occurred during the time when the collision of packets is being resolved. Thus, rather than sacrificing a time slot by transmitting a dummy packet to determine whether the negative feedback (no-success feedback) was due to a collision of re-transmitted packets in the respective slot or whether it was due to this slot having been empty, numeric values of parameters determining the order of the re-transmission of these packets are altered and the resolution of the collision is continued. This has the advantage that, without sacrificing a time slot for a dummy packet, repeated collisions can be resolved without risking a deadlock due to successive re-transmission of the same colliding packets.

In a preferred embodiment of the present invention, the numeric value of said parameter assigned to each packet is based on the generation time of the respective packet.

In the present invention, said step of altering the numeric values of said parameters is preferably done by randomization.

Preferably, in the present invention, a dummy packet, to determine whether a negative feedback (no-success feedback) was due to a collision of packets in the respective slot or whether it was due to this slot having been empty, is only transmitted following certain occurrences of negative feedback, namely following the first negative feedback after a prior collision has been (fully) resolved. This has the advantage that the number of slots sacrificed for dummy packets can thereby be reduced.

Preferably, enabling the re-transmission of said unsuccessfully transmitted packets is determined in the present invention by a predefined parameter dividing said interval into two portions. This approach provides an easy means to distinctively enable subsets of the interval containing the colliding packets.

In a variant of the present invention, said predefined parameter is varied depending on the number of collisions. This has the advantage that the method and its efficiency can be adapted dynamically to the current situation of the transmission channel.

Preferably, in the present invention, a collision is resolved after two consecutive successful transmissions indicated by two consecutive positive feedback messages (success feedback).

In the present invention, terminal devices not involved in a collision resolution are preferably only allowed to transmit packets after they have learned that the collision is resolved.

In a preferred embodiment of the present invention, at least certain of said communication networks are mobile radio networks and at least certain of said terminal devices are mobile telephones.

An embodiment of the present invention is described below by way of example. The embodiment example is illustrated by means of the following appended figures.

Figure 4:
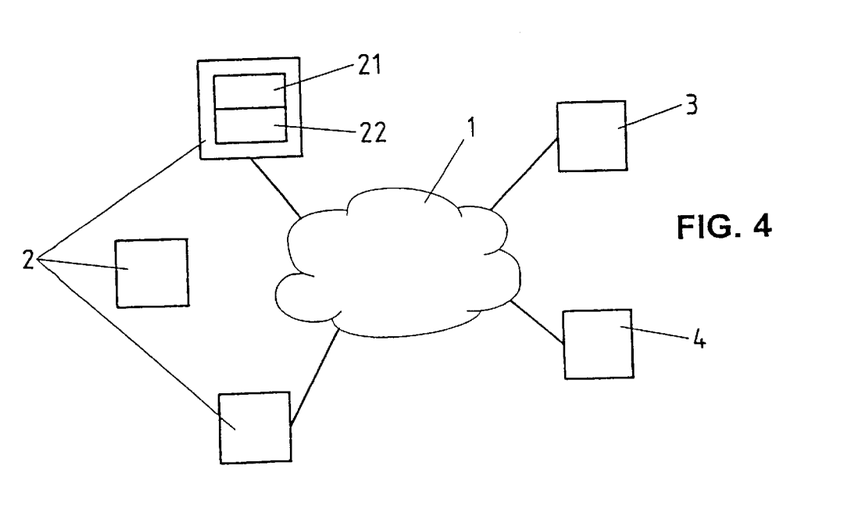
FIG. 4 shows a block diagram of a schematic communication network with terminal devices (users), a common receiver, and an auxiliary user.

The proposed method is intended for random-access communication in communication networks 1, as illustrated in FIG. 4, with time-slotted transmission channels which are accessed by a plurality of terminal devices 2, i.e. users 2 of the communication network 1, for instance satellite communication networks, local area networks or mobile radio networks. Consequently, the transmission channel to a receiving user 2, 3, i.e. the forward channel, is a time-slotted collision type channel. Eventual noise or other disturbances on the forward channel are not considered in this method and are assumed to be handled by other means, e.g. other additional communication protocol layers which are not a subject of the proposed method. It is assumed that a collision between two or more data packets destroys all the information contained therein, i.e. the packets involved in a collision cannot, be reconstructed at the receiving user 2, 3. Furthermore, the users 2 are assumed to send packets with a duration of one slot, i.e. only one user 2 can successfully send one packet during one slot.

In the proposed method, participating users 2 in the communication network 1 are provided with binary success/no-success feedback $S/\overline{S}$ at the end of every slot, for instance by at least one common receiver 3. Thereby, the users 2 are informed whether that slot contained exactly one packet, which was thus successfully transmitted, or whether that slot did not contain exactly one packet, i.e. the slot was either empty or it contained two or more colliding packets and a collision resolution process must be initiated. As was stated for the forward channel, eventual noise or other disturbances on the feedback channel, i.e. the transmission channel for providing the feedback to the users 2, are not considered in this method and are assumed to be handled by other means, e.g. other additional communication protocol layers which are not a subject of the proposed method. It should also be noted that the propagation delay for providing the binary feedback is assumed to be negligibly small compared to the duration of a slot, so that the feedback information for a given slot can be effectively used to determine who can transmit in the subsequent slot. The common receiver 3 can be implemented in different ways known to one skilled in the art and may depend on the type of communication network 1 used. For instance, in a mobile radio network, the common receiver 3 may be implemented by means of a respective software program in the base stations of the network, in which base stations it is stored in memory or on a data carrier and where it is executed by a processor.

For further clarification, it should be mentioned that the forward channel and the feedback channel may be realized through the same communications means, for instance if the feedback is provided by a common receiver 3 implemented in a dedicated device connected to the network 1, or through different communications means, for instance if the feedback is provided by some means located in at least certain terminal devices 2 connected to the network 1.

As was indicated above, the binary feedback $S/\overline{S}$ used in the proposed method does not explicitly enable the users 2 to distinguish between empty slots and slots with colliding packets. Although a user 2 who sent a packet in a given slot and who receives a no-success feedback $\overline{S}$ knows that there has been a collision, a "silent" user 2 is not able to distinguish between an empty slot and a collision. To enable all the users 2 to distinguish between an empty slot and a collision, the method makes use of at least one auxiliary user 4, who is a dummy user 4 transmitting dummy packets during particular slots as dictated by the collision resolution method of the present invention. The purpose of the auxiliary user's 4 action is to implicitly transform the binary success/no-success feedback $S/\overline{S}$ into a ternary idle/success/collision-type feedback by sacrificing one slot. As already mentioned, for a protocol to be a collision resolution algorithm, it is mandatory that all the users 2 recognize the end of a collision resolution. The auxiliary, or dummy, user 4 can be implemented in different ways known to one skilled in the art and may depend on the type of communication network 1 used. For instance, in a mobile radio network, the auxiliary user 4 may be implemented by means of a respective software program in the base stations, or in a local area network, it may be implemented in a special purpose node of the network. In a base station or in a special purpose node, respectively, the software program may be stored in a memory or on a data carrier, and it may be executed by a processor. In a variant, the common receiver 3 and the auxiliary user 4 may be implemented on the same physical device.

It should also be pointed out that the proposed method is based on blocked access during collision resolution, i.e. users 2 not involved in the collision resolution process are not allowed to transmit any packets until they have been informed that the respective collision is resolved. Because users 2 who have not transmitted any data cannot distinguish between empty slots and slots with colliding packets, this means that they are not allowed to transmit any packets from the time when a negative feedback $\overline{S}$ occurred until they have been informed that the negative feedback $\overline{S}$ was due to an empty slot or that the respective collision is resolved. For that purpose, terminal devices 2 connected to the communication network 1, i.e. participating users 2, execute the proposed method, as will be described in more detail in the following paragraphs.

Figure 2:
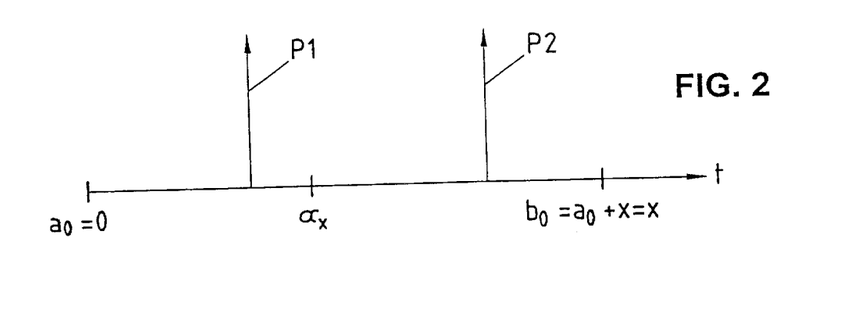
FIG. 2 shows an example of packets generated for transmission in the interval [0, x).

In the proposed method for random-access communication with binary feedback S/$\overline{S}$, data packets which are generated by the users 2 in the interval $[a_t, b_t)$, i.e. in an interval with an included lower boundary $a_t$ and an excluded upper boundary $b_t$, may be transmitted in the enabled interval $E_{t+1}=[a_t, b_t)$ during the slot t+1. For instance, FIG. 2 shows an interval $[0, x)$, with a lower boundary of $a_0=0$, and an upper boundary of $b_0=a_0+x=x$, in which two packets P1 and P2 were generated. When the interval $E_1=[0, x)$ is enabled, these two packets may both be transmitted during slot 1, which has a duration of x, where they will collide with each other because only one packet can be successfully transmitted during one slot as was mentioned earlier. The resolution of this collision and the retransmission of the two packets P1, P2 in subsequent slots will be explained later in more detail.

The outcome of any (respectively no) communication activity during an enabled interval $E_t$, i.e. the binary feedback S/$\overline{S}$ indicating whether the corresponding slot contained a successfully transmitted packet or whether that particular slot did not contain a successfully transmitted packet, is indicated by the function $\theta(E_t)$ which is executed, for instance, by the common receiver 3, as was described above, whereby $\theta(E_t)=S$ indicates a successful outcome, i.e. the respective slot contained a successfully transmitted packet, and $\theta(E_t)=\overline{S}$ indicates that there was not a successful outcome, i.e. the respective slot did not contain a successfully transmitted packet.

Figure 1:
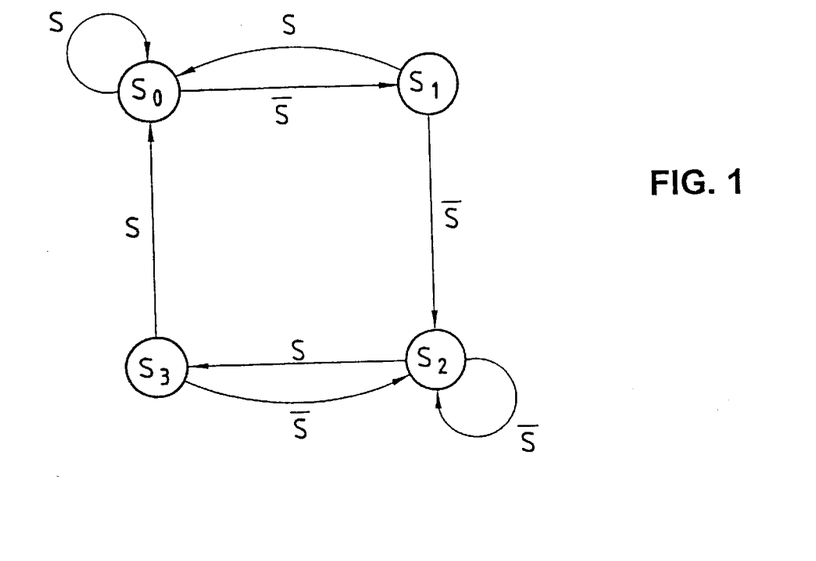
FIG. 1 shows a state diagram for the success/no-success feedback.

The state diagram shown in FIG. 1 illustrates the state transitions between the states $S_0$, $S_1$, $S_2$, and $S_3$, which state transitions indicate the outcome of an enabled interval $E_t$, i.e. the value of the function $\theta(E_t)$. The state transitions determine how a subsequent interval $E_{t+1}$ depends on a previously enabled interval $E_t$ and on the outcome $\theta(E_t)$ of that interval. The method is initiated in state $S_0$ and as long as the outcome $\theta(E_t)$ of an enabled interval $E_t$ is successful, i.e. $\theta(E_t)=S$, the method remains in state $S_0$. For a participating user 2, i.e. a particular terminal device 2 connected to the communication network 1 and executing the method, this means that, while in state $S_0$, it remains in state $S_0$ as long as it receives a positive feedback S.

Figure 3:
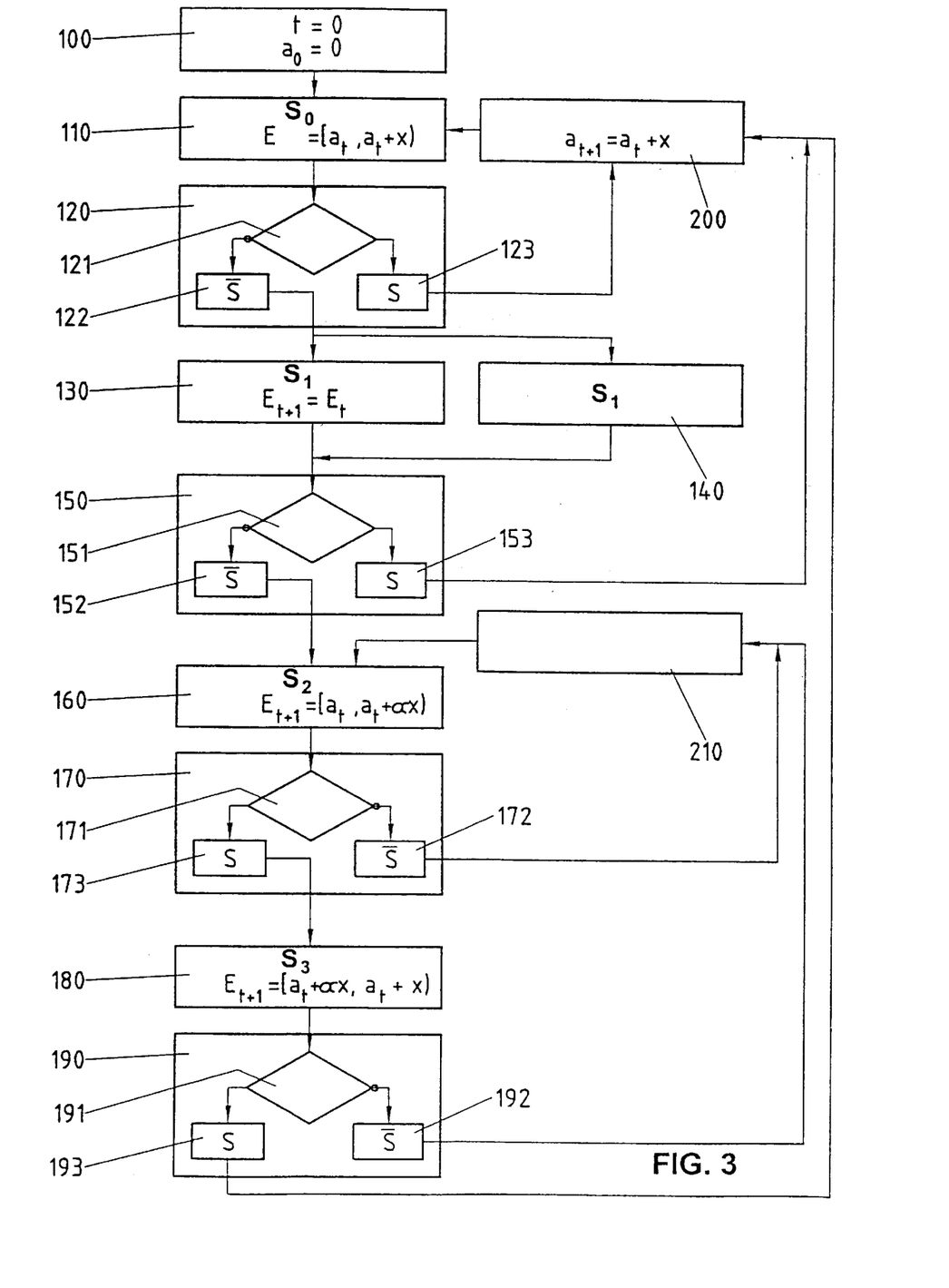
FIG. 3 shows a flow diagram of the method for random-access communication with success/no-success feedback.

In the initial step 100 of the flow chart shown in FIG. 3, the method is initiated at t=0 with the initial value $a_0=0$ and continues in step 110 with the initial state $S_0$ and the initial enabled interval $E_1=[0, x)$. Thus any data packets generated by the users 2 in the interval $E_1=[0, x)$ may be transmitted during slot t=1 corresponding to this initial interval. The value of x (x>0) will be determined later.

In step 120, the common receiver 3 provides the users 2 with the feedback to the previously enabled interval by checking in step 121 whether or not it received a successfully transmitted data packet. If there was a successfully transmitted data packet, the common receiver 3 provides all the users 2 with a positive feedback S in step 123. The users 2, still being in state $S_0$ and being provided with the positive feedback $\theta(E_1)=S$, will increment the interval $a_{t=1}=a_1+x$ in step 200 and proceed with step 110, enabling the next interval $E_{t+1}=[a_t, a_t+x)$. However, if the common receiver 3 determines in step 121 that it did not receive a successfully transmitted data packet, be it because there was a collision between multiple data packets or be it because the slot was empty, the common receiver 3 provides all the users 2 with a negative feedback $\overline{S}$ in step 122.

Upon being provided with a negative feedback $\overline{S}$ while being in state $S_0$, the method moves to state $S_1$, as is illustrated in FIG. 1. In the flow chart illustrated in FIG. 3, this is reflected in step 130 where the users 2 set the state to $S_1$ and re-enable the previously enabled interval $E_{t+1}=E_t$. Simultaneously, the auxiliary, or dummy, user 4 sets the state to $S_1$, and sends out a dummy packet in step 140. Thus, if the negative feedback $\overline{S}$ issued in step 122 was due to colliding data packets, these data packets will collide again in the re-enabled interval $E_{t=1}=E_t$, whereas, if the negative feedback $\overline{S}$ issued in step 122 was due to an empty slot, the dummy packet sent out in step 140 by the auxiliary user 4 will be transmitted without a collision.

In step 150, the common receiver 3 provides the users 2 with the feedback to the previously re-enabled interval by checking in step 151 whether or not it received a successfully transmitted data packet. If there was a successfully transmitted data packet, i.e. if the dummy packet was delivered without a collision, the common receiver 3 provides all the users 2 with a positive feedback S in step 153. As is illustrated in the state diagram in FIG. 1, upon being provided with a positive feedback S in state $S_1$ the method will move back to state $S_0$. As can be seen in FIG. 3, the users 2, being in state $S_1$ and being provided with the positive feedback S, will increment the interval $a_{t+1}=a_t+x$ in step 200 and proceed with step 110, enabling the next interval $E_{t+1}=[a_t, a_t+x)$ in state $S_0$. However, if the common receiver 3 determines in step 151 that it did not receive a successfully transmitted data packet, it provides all the users 2 with a negative feedback $\overline{S}$ in step 152. Thus, upon being provided by the common receiver 3 with the negative feedback $\overline{S}$ in step 152, all the users 2 are aware that the initial negative feedback $\overline{S}$ provided by the common receiver 3 in step 122 was due to a collision of data packets rather than due to an empty slot.

As illustrated in the state diagram in FIG. 1, upon being provided with a negative feedback $\overline{S}$ in state $S_1$, the method moves to state $S_2$. Correspondingly, in step 160 of the flow chart shown in FIG. 3, in state $S_2$, the users 2 commence the resolution of the detected collision by enabling the lower portion $E_{t+1}=[a_t, a_t+\alpha x)$ of the previously re-enabled interval. Thus only the data packets generated within this lower portion of the interval will be re-transmitted by the respective user(s) 2. The optimal value of $\alpha (1 \geq \alpha \geq 0)$, the parameter dividing the interval into two portions, will be determined later.

In step 170, the common receiver 3 provides the users 2 with the feedback to the re-enabled lower portion of the interval by checking in step 171 whether or not it received a successfully transmitted data packet. If the common receiver 3 determines in step 171 that it did not receive a successfully transmitted data packet, it provides all the users with a negative feedback $\overline{S}$ in step 172. However, at this stage it is not clear whether the negative feedback is due to a collision of multiple packets in the lower portion of the interval or whether it is due to an empty slot. Rather than sacrificing another slot by issuing another dummy packet and to avoid re-enabling the same empty slot, the method proceeds by changing the positions of the (at least two remaining) packets in the interval. Thus in step 210, the users 2 involved in the collision resolution randomize the positions of their packets in the interval. This can be achieved by random algorithms known to one skilled in the art which are suitable for distributed systems, i.e. algorithms that will not concurrently produce the same identical random values in different terminal devices 2 connected to the communication network 1. As is shown in the state diagram in FIG. 1, upon being provided with a negative feedback $\overline{S}$ in state $S_2$, the method remains in state $S_2$. As can be seen in the flow chart in FIG. 3, the users 2 continue in step 160 in state $S_2$ and re-enable the same lower portion $E_{t+1}=[a_t, a_t+\alpha x)$ of the interval, this time however, the data packets of the involved users 2 have new positions within the interval.

On the other hand, if the common receiver 3 determined in step 171 that there was a successfully transmitted data packet, the common receiver 3 provides all the users 2 with a positive feedback S in step 173, indicating that at least one of the colliding packets had now been successfully re-transmitted. As is illustrated in the state diagram in FIG. 1, upon being provided with a positive feedback S in state $S_2$ the method will move to state $S_3$. As can be seen in FIG. 3, the users 2 involved in the collision resolution and still having a data packet to be re-transmitted continue in step 180 in state $S_3$ by enabling the whole interval $E_{t+1}=[a_t, a_t+x)$, which is equivalent to enabling the remaining upper portion of the interval $E_{t+1}=[a_t+\alpha x, a_t+x)$, thus re-transmitting data packets with a position in this upper portion.

In step 190, the common receiver 3 provides the users 2 with the feedback to the re-enabled upper portion of the interval by checking in step 191 whether or not it received a successfully transmitted data packet. If the common receiver 3 determines in step 191 that it did not receive a successfully transmitted data packet it provides all the users 2 with a negative feedback $\overline{S}$ in step 192. As is shown in the state diagram in FIG. 1, upon being provided with a negative feedback $\overline{S}$ in state $S_3$, the method continues in state $S_2$. As can be seen in the flow chart in FIG. 3, the users 2 involved continue by again randomizing the positions of the remaining packets in step 210 and by again re-enabling the lower portion of the interval $E_{t+1}=[a_t, a_t+\alpha x)$. If, however, the common receiver 3 determines in step 191 that that there was a successfully transmitted data packet, the common receiver 3 provides all the users 2 with a positive feedback S in step 193, indicating that the one remaining data packet had now been successfully retransmitted. As is illustrated in the state diagram in FIG. 1, upon being provided with a positive feedback S in state $S_3$, the method will move to state $S_0$, and the collision is resolved. As can be seen in the state diagram in FIG. 1 and in the flow chart in FIG. 3, the resolution of the collision ends after two consecutive successful transmissions, thus all the participating users 2 can detect the end of a collision resolution.

As is illustrated in the flow chart of FIG. 3, after the collision resolution, the users 2 will increment the interval $a_{t+1}=a_t+x$ in step 200 and proceed with step 110, enabling the next interval $E_{t+1}=[a_t, a_t+x)$ in state $S_0$.

One skilled in the art will know various ways in which the proposed method can be implemented in the terminal devices 2. For instance, the respective steps of the method, as illustrated in the flow chart of FIG. 3, which are executed by the terminal devices 2, can be implemented as a software program stored by storage means 21 of the terminal device 2, e.g. a programmable memory or the memory of a chipcard, and executed by processing means 22 of the terminal device, e.g. a microprocessor, or of a chipcard. Aside from processing and storage means for executing the method according to the invention, all devices participating in this method must also be provided with means for storing the state information, e.g. in a read and write memory of the device or of a chipcard inserted into the device, to keep track of the state transitions.

TABLE 1

| t | $E_t$ | State | $\theta(E_t)$ |
|---|---|---|---|
| 1 | [0, x) | $S_0$ | $\overline{S}$ |
| 2 | [0, x) | $S_1$ | $\overline{S}$ |
| 3 | [0, x) | $S_2$ | S |
| 4 | [$\alpha$x, x) | $S_3$ | S |

For further clarification, FIG. 2 illustrates an example of packets generated for transmission in the interval [0, x). The vertical arrows along the time axis t indicate when sources, i.e. participating users 2, have generated packets P1, P2, for transmission. As can be seen in Table 1, the method is initiated in state $S_0$ by enabling the interval $E_1=[0, x)$, i.e. by enabling the transmission of the packets P1 and P2 during the slot t=1. As there are two data packets P1, P2 that are transmitted in the one slot corresponding to the enable interval $E_1=[0, x)$, the respective feedback $\theta(E_1)$ is negative $\overline{S}$. During the next slot t=2, method is in state $S_1$, the users 2 re-enable the previous interval $E_2=[0, x)$, i.e. the same data packets P1, P2 are re-transmitted, and the auxiliary user 4 transmits a dummy packet. The resulting feedback $\theta(E_2)$ is again negative $\overline{S}$, it is clear that there was a collision. During the slot t=3, the method is in state $S_2$, the users 2 commence the resolution of the collision by enabling the lower portion of the previous interval $E_3=[0, \alpha x)$, i.e. only the data packet P1 in the lower portion of the interval is re-transmitted. The corresponding feedback $\theta(E_3)$ is positive S, and the method moves to state $S_3$. During the slot t=4, the respective user 2 enables the upper portion of the interval $E_4=[\alpha x, x)$ and, thus, re-transmits the remaining data packet P2 in the upper portion of the interval. As the corresponding feedback $\theta(E_4)$ is positive S, the collision resolution ends and, at the beginning of slot t=5, the method will continue in state $S_0$ enabling the interval $E_5=[x, 2x)$.

It should be noted that because of the randomization of the packets' position, the packets are not necessarily transmitted in the same order as they were generated. Hence, the method is not of the type "first-come first-served".

In the following paragraphs, the performance, i.e. the throughput, of the method and the values for the parameters x and $\alpha$ are determined. It should be noted again that the propagation delay for providing the binary feedback is assumed to be, negligibly small compared to the duration of a slot, so that the feedback information for a given slot can be effectively used to determine who can transmit in the subsequent slot. As was mentioned earlier, an interval is considered to be resolved when all the packets generated in this interval have been successfully transmitted. A basic interval commences after a prior interval has been resolved. Each time period between successive returns to processing basic intervals is a collision resolution interval (CRI). The performance, i.e. the throughput, of the method, measured in terms of successful transmissions per channel use, can be found by using the following renewal-theoretic argument. The time axis is partitioned into series of collision resolution intervals used by the method and said collision resolution intervals are distinguished according to the number of messages that they contain initially. Because the arrival process is Poisson, it is assumed that the initial distribution of messages within any interval of the real time axis is uniform, so that the probability that k messages are found in the first subinterval of length a containing i messages is given by:

$$p_{k,i} = \binom{k}{i} a^i (1-a)^{k-i}$$

The quantity of principal interest is $\omega^k = E[W_k]$, the average number of slots needed to resolve a collision of k senders. It can be seen that $\omega_0=2$ and $\omega_1=1$ because there is no initial collision (FIG. 1). It can further be seen that:

$$\omega_2 = 2 + (1-p_{2,1})(\omega_2-1) + 2p_{2,1} \quad (1)$$

This is because after the initial no-success feedback (collision) and after the transmission of the auxiliary user's packet, with the probability of $1-p_{2,1}$, the two sending users 2 are either both granted transmission rights or neither one of them is granted a transmission right (enabled). In this case, another $\omega_2 - 1$ slots are needed to resolve the collision. On the other hand, when only one user 2 is in the enabled set, the method moves from state $S_2$ to $S_3$ with the probability of $p_{2,1}$, and the first packet is transmitted successfully. Because in $S_3$ the entire interval is enabled, the remaining packet is transmitted successfully, and the collision is resolved. The average number of slots required to resolve a collision of two packets follows as a result of solving equation (1):

$$\omega_2 = 3 + \frac{1}{p_{2,1}}$$

The general recursion for $\omega_k$ can be written as:

$$\omega_k = 2 + (1-p_{k,1})(\omega_k-1) + p_{k,1}\omega_{k-1}, \; k>2$$

with the boundary condition $\omega_2 = 3 + 1/p_{2,1}$.
Equivalently, it can be stated that:

$$\omega_k = 1 + k + \sum_{i=2}^{k} \frac{1}{p_{i,1}}, \; k \geq 2 \quad (2)$$

$$= 1 + k + \frac{1}{\alpha} \sum_{i=2}^{k} \frac{(1-\alpha)^{1-i}}{i}.$$

The expected number of messages actually transmitted in a basic interval initially containing k messages, $n_k$, is equal to k because the above algorithm successfully transmits all the arriving packets in the basic interval of length x between successive returns to state $S_0$:

$$n_k = k. \quad (3)$$

The Markovian property of state $S_0$ makes it possible, via the rule of the large numbers argument (or, equivalently, from the limit theorem for renewal processes), to express the "long-run" throughput η as the ratio given in equation (4). Thus, the throughput is equal to the probability that a random observation over the time axis encounters a success:

$$\eta \equiv \frac{E[N]}{E[W]} = \sum_{k=0}^{\infty} q_k n_k \bigg/ \sum_{k=0}^{\infty} q_k \omega_k \quad (4)$$

where $q_k$ is the probability that a basic interval initially contains k messages. As long as the system does not empty itself (it is assumed that the system is heavily loaded), the number of messages in an initial time window has a Poisson distribution, whereby the parameter λx is independent of the past history of channel activity. In this case:

$$q_k = \frac{(\lambda x)^k}{k!} e^{-\lambda x}, \text{ yielding } \sum_{k=0}^{\infty} q_k n_k = \lambda x.$$

Equations (3) and (4) give a numerical procedure for finding the efficiency of the proposed algorithm for any λx and α. Computational results show a maximum stable throughput of the algorithm of approximately 0.372, which is achieved when λx is approximately λx≈1.40 (rounded to two significant decimal digits) and a is approximately α≈0.38. If the average arrival rate is less than 0.372 messages per slot, the system will eventually empty itself and thus be stable.

The proposed method's calculated throughput of 0.372 is higher than any throughput of other random access communication methods with binary success/no-success feedback known in the prior art.

It should be pointed out that the proposed method never makes any prior assumptions about the presence of packets of enabled intervals $E_r$. Consequently, the proposed method also operates properly in an environment where new senders are entering the communication system.

In a variant of the proposed method, the value of the parameter a is varied depending on the number of times the method goes through state $S_2$, i.e. it is varied depending on the number of collisions. Thereby, the efficiency of the proposed method can be improved even further.

It was stated earlier that when unsuccessfully transmitted packets are re-transmitted in accordance with their position in the enabled interval, the position of a specific packet is determined based on the generation time of that packet. It should be noted, however, that, even before randomization takes place, numeric values other than generation times could be used by one skilled in the art to distinguish data packets with respect to their position in the enabled interval.

What is claimed is:

1. Method for random-access communication in communication networks (1) with time-slotted transmission channels which are being accessed by a plurality of terminal devices (2), whereby the terminal devices (2) are provided with binary feedback (S/$\bar{S}$), a positive feedback (S) indicating that a particular slot contained a successfully transmitted packet or a negative feedback ($\bar{S}$) indicating that the particular slot did not contain a successfully transmitted packet, whereby an auxiliary user (4) transmits dummy packets following certain occurrences of negative feedback ($\bar{S}$) to determine whether said negative ($\bar{S}$) feedback was due to a collision of packets in the respective slot or whether it was due to this slot having been empty, and whereby unsuccessfully transmitted packets are re-transmitted, characterized in that the order of retransmitting said unsuccessfully transmitted packets depends on their respective position in an interval, which position is determined by the numeric value of a parameter assigned to each packet, and which numeric values are altered (210) after a negative feedback ($\overline{S}$) occurred during the resolution of said collision ($S_2$–$S_3$).

2. Method according to claim 1, characterized in that a said certain occurrence of negative feedback ($\overline{S}$) is the first negative feedback ($\overline{S}$) after a prior collision has been resolved.

3. Method according to claim 1, characterized in that at least certain of said numeric values are determined based on the generation time of a packet.

4. Method according to claim 1, characterized in that said step of altering (210) said numeric values is done by randomization.

5. Method according to claim 1, characterized in that enabling the re-transmission of said unsuccessfully transmitted packets is determined by a predefined parameter ($\alpha$) dividing said interval into two portions.

6. Method according to claim 1, characterized in that the said predefined parameter ($\alpha$) is varied depending on the number of collisions.

7. Method according to claim 1, characterized in that a collision is resolved after two consecutive successful transmissions indicated by two consecutive positive feedback messages (S).

8. Method according to claim 1, characterized in that terminal devices (2) not involved in a collision resolution are only allowed to transmit packets after they have learned that the collision is resolved.

9. Method according to claim 1, characterized in that at least certain of said communication networks (1) are mobile radio networks and that at least certain of said terminal devices (2) are mobile telephones.

10. Method according to claim 1, characterized in that said binary feedback ($S/\overline{S}$) is provided to the terminal devices (2) by at least one common receiver (3).

11. Terminal device (2) for random-access communication in communication networks (1) with time-slotted transmission channels, characterized in that it comprises processing (22) and storage means (21) to execute the method according to claim 1.

12. Terminal device (2) according to claim 11, characterized in that it is a mobile telephone (2) for communicating in a mobile radio network (1).

\* \* \* \* \*

UNITED STATES PATENT AND TRADEMARK OFFICE
CERTIFICATE OF CORRECTION

PATENT NO.     : 6,449,282 B1                                               Page 1 of 1
DATED          : September 10, 2002
INVENTOR(S)    : Loher

It is certified that error appears in the above-identified patent and that said Letters Patent is hereby corrected as shown below:

<u>Title page,</u>
Item [73], should read:

-- [73] Assignee: Swisscom Mobile AG, Bern (CH) --

Signed and Sealed this

Twenty-second Day of April, 2003

JAMES E. ROGAN
*Director of the United States Patent and Trademark Office*